United States Patent
Lauronen

(10) Patent No.: US 8,674,807 B2
(45) Date of Patent: Mar. 18, 2014

(54) METHOD, SYSTEM AND DEVICES FOR DATA ACQUISITION

(75) Inventor: Mika Lauronen, Villala (FI)

(73) Assignee: Sensire Oy (Ltd.), Joensuu (FI)

(*) Notice: Subject to any disclaimer, the term of this patent is extended or adjusted under 35 U.S.C. 154(b) by 874 days.

(21) Appl. No.: 12/746,311

(22) PCT Filed: Dec. 4, 2008

(86) PCT No.: PCT/FI2008/050710
§ 371 (c)(1),
(2), (4) Date: Jun. 4, 2010

(87) PCT Pub. No.: WO2009/071747
PCT Pub. Date: Jun. 11, 2009

(65) Prior Publication Data
US 2010/0308967 A1    Dec. 9, 2010

(30) Foreign Application Priority Data
Dec. 4, 2007 (FI) ..................... 20075874

(51) Int. Cl.
*H04Q 5/22* (2006.01)
*G08B 13/14* (2006.01)
*G08B 1/08* (2006.01)
*H04B 5/00* (2006.01)
*H04M 1/00* (2006.01)
*H04W 4/00* (2009.01)

(52) U.S. Cl.
USPC ... 340/10.1; 340/10.5; 340/572.1; 340/539.1; 340/572.3; 455/41.2; 455/552.1; 455/554.2; 370/338; 370/331

(58) Field of Classification Search
USPC .............. 340/10.1, 636.1, 539.1, 572.1, 10.2, 340/10.42, 573.1, 573.4; 370/338, 328, 370/329, 331, 465; 455/552.1, 553.1, 455/554.2, 556.1, 556.2, 41.2, 432.2, 411
See application file for complete search history.

(56) References Cited

U.S. PATENT DOCUMENTS 6,892,052 B2 *  5/2005  Kotola et al. ................ 455/41.2
2004/0203352 A1  10/2004  Hall et al.
(Continued)

FOREIGN PATENT DOCUMENTS

WO    2007/099340    9/2007

OTHER PUBLICATIONS

Nilsson B. et al., "Protocols for Active RFID—The Energy Consumption Aspect", SIES '07. International Symposium on Industrial Embedded Systems, Jul. 4-6, 2007, pp. 41-48, whole document, especially parts I, III, IVV, and Figure 1.

(Continued)

*Primary Examiner* — Jennifer Mehmood
*Assistant Examiner* — Mirza Alam
(74) *Attorney, Agent, or Firm* — Young & Thompson

(57) ABSTRACT

The present invention relates generally to acquisition of data from RFID devices (132-136), such as sensor data. Prior art systems of active RFID devices have a problem of high average power consumption, and therefore, the energy source of the RFID devices needs to be replaced or charged frequently. The present invention provides a new solution wherein the RFID device has a power saving mode in which the receiver of the RFID device has a decreased ability to receive/detect RF signals. The RFID device may include a timer which is functional during the power saving mode, and the receiver of the RFID device will turn into active mode at a point of time based on the time value of the timer. Signal strength of an RF channel is indicated with a receiver, and transmission of data is dependent on the indication of the signal strength.

38 Claims, 5 Drawing Sheets

(56) References Cited

U.S. PATENT DOCUMENTS

| | | | |
|---|---|---|---|
| 2005/0030160 A1* | 2/2005 | Goren et al. | 340/10.5 |
| 2005/0073406 A1* | 4/2005 | Easley et al. | 340/539.1 |
| 2005/0200456 A1* | 9/2005 | Bridgelall | 340/10.1 |
| 2007/0046467 A1* | 3/2007 | Chakraborty et al. | 340/572.1 |
| 2007/0103303 A1* | 5/2007 | Shoarinejad | 340/572.1 |
| 2007/0142020 A1 | 6/2007 | Rotzoll | |
| 2007/0257796 A1* | 11/2007 | Easton et al. | 340/572.1 |
| 2008/0231449 A1* | 9/2008 | Moshfeghi | 340/572.1 |

OTHER PUBLICATIONS

International Search Report dated Mar. 19, 2009, from corresponding PCT application.

* cited by examiner

METHOD, SYSTEM AND DEVICES FOR DATA ACQUISITION

FIELD OF THE INVENTION

The present invention relates generally to acquisition of data from RFID devices, such as sensor data. More specifically, the present invention relates to what is disclosed in the preamble of the independent claims.

BACKGROUND

RFID technology concerns identification techniques enabling remote data retrieval via radio frequencies from RFID devices hereinafter also referred to as "tags". The tags can be included in or attached to target objects such as different kinds of products or humans/animals that are to be identified. In addition to mere identifying a tag may incorporate or it may at least be functionally connected to one or more sensors providing measurement data to be passed forward by the communication means of the tag. A device called an RFID reader comprises an RF transceiver, or at least a receiver in the case of active tags described hereinafter, which can be used to remotely acquire the data from the tag whereby the physical distance between the reader and the tag may vary from few centimeters to hundreds of meters depending on the nature of the tag and prevailing conditions such as the presence of obstacles or interference in the radio path.

Passive tags include a transmit circuit that powers up upon absorbing radiated energy from a reader device so as to transmit the ID and optional other information to the reader via a local antenna, meanwhile active tags include, or are at least connected to, a power source of their own, which provides necessary energy for the internal chip(s) and data transmission. Such a power source may be a disposable or rechargeable battery, for example. There are also so-called semi-passive tags that indeed have a power supply for limited use but also received radiation is utilized for powering up local functionalities. Active tags may have a range of hundreds of meters whereas passive tags are limited to much shorter communication distances. In this patent application mainly active tags are discussed, but the invention is not restricted into active tags or any particular form of providing operating energy for the tag.

The tags may have processing and memory means for processing and storing instructions and other data. The tags may also have data transfer means including an antenna for sending data to external devices such as readers. The various means may be integrated in one or more chips, for example. In addition the tags may incorporate or be at least functionally connectable to one or more sensors that are configured to provide the aforementioned measurement data forward, if necessary.

RFID technology is often used in different product or human/animal tracking and/or control applications. E.g. in logistic applications the tags attached to moveable goods facilitate real-time monitoring of product status and location while the goods are being relocated or during storage. RFID tags shall preferably be light, small-sized, affordable, durable, and versatile. Such requirements are not particularly easy to implement in a single generic product, and the product development in the field has diverged into multiple directions depending on each application dictating its own requirements and preferences.

There are several types of wireless RF communications that are available for data transfer between RFID tags and other parts of the system. Especially, wireless data transfer formats have been developed for short range communications between computers and other data processing and communications equipment. In such applications it is often necessary to transfer large amounts of data, and the data transfer rate is required to be high. Also, the response delays in any such communications are required to be very short. However, such requirements also mean that the RF transceiver parts of the devices have high current consumption. This is not a problem in data processing equipment if they can be equipped with high capacity batteries or they can use mains voltage. In RFID applications, however, current consumption is an important issue, and therefore the high rate communication channels are generally not suitable for communication between RFID tags and a master device.

There also exist frequency channels wherein the form of the data transfer is not restricted, and which are used for slow rate communications. Examples of such channels are located in e.g. 433.92 MHz or 868-915 MHz frequency ranges. In prior art wireless sensor systems, the master device controls the usage of the channel. The master device may thus initiate the data transfer with one RFID device at a time. It is also possible that the master device allocates certain time slots for each RFID device of the system. The RFID devices can then listen to the timing signals broadcasted by the master device, and use their allocated time slots for sending data to the master device. However, this prior art solution also includes a problem concerning current consumption of the RFID devices. If the master device initiates the data transfer with an RFID device, the RFID device must continuously receive and monitor the RF channel in order receive the data transmission requests from the master device. On the other hand, if the master device allocates certain time slots for the RFID devices, the RFID devices must listen to the timing signals from the master device and wait for their turn to be able to transmit data. So also in this case the RFID transceiver must be powered most of the time.

It is desirable that the RFID devices can be installed to e.g. mobile targets, and that the RFID devices remain operable for long periods without a need for servicing. It is also desirable that the RFID devices are small in size and inexpensive to manufacture. However, an RF transceiver has generally an essential consumption of power in its active state, and therefore, long operation times would require batteries of large size and high cost in the RFID devices.

SUMMARY OF THE INVENTION

An object of the present invention is to provide a data acquisition method, system and devices wherein the described disadvantages of the prior art are avoided or reduced.

The object of the invention is therefore to provide technology wherein reliable data transfer and long operating cycles are achieved without a frequent requirement for recharging or changing batteries of RFID devices.

The object of the invention is achieved with a new solution wherein an RFID device has a power saving mode in which the receiver of the RFID device has a decreased ability to receive/detect RF signals. The RFID device may have a timer which is functional during the power saving mode, and the receiver of the RFID device may turn into active mode at a point of time based on the time value of the timer. Also, the RF signal strength is indicated with the receiver, and the transmission of data is dependent on the indication of the signal strength.

In the inventive solution it is possible to keep the receiver active for only short periods because it is not necessary to detect and process data transmitted from the master device in order to start the transmission of data from the RFID device.

A system for acquisition of data, wherein the system has:
a plurality of RFID devices,
at least one second device, such as a router or a master device,
means for transferring on RF channel data from one of said RFID devices to said second device,
means for transferring on RF channel an acknowledge message from said second device to said one RFID device,
is characterized in that
the RFID device has an active mode and a power saving mode,
in the power saving mode of the RFID device its capability to receive data on the RF channel is lower than in the active mode,
the system has means for indicating RF signal strength on the RF channel, and
the transfer of said data and/or acknowledge message is dependent on the value of the indicated signal strength.

An RFID device for wireless transmission of data, wherein the data comprises at least identification information identifying a source of the data, wherein the RFID device comprises
means for transmitting data on RF channel, and
means for receiving on RF channel an acknowledge message,
is characterized in that
the RFID device has an active mode and a power saving mode,
in the power saving mode of the RFID device its capability to receive messages is lower than in the active mode,
The RFID device has means for indicating RF signal strength on the RF channel, and
the transfer of said data is dependent on the value of the indicated signal strength.

A method for transferring data from an RFID device to a second device of a data acquisition system is characterized in that
the RFID device has an active mode and a power saving mode wherein in the power saving mode the RFID device has a decreased or no capability to receive information from an RF channel when compared to the capability in the active mode,
the RFID device is activated from the power saving mode into an active mode,
signal strength of the RF channel is indicated in the active mode,
the indicated signal strength is compared with a predetermined value,
data is transmitted from the RFID device on the basis of the result of the comparison,
the RFID device is set into the power saving mode.

In one embodiment of the invention a sensor signal is received from a sensor to the RFID device, and the transmitted data includes information relating to the received sensor signal.

In another embodiment of the invention signal strength of the RF channel is indicated in at least two successive periods prior to transmitting the data. In a further embodiment of the invention the transmission of data on the RF channel is actuated if the signal strength indicated on the RF channel does not exceed a predetermined level.

In one embodiment of the invention acknowledgement message is transferred from the second device to the RFID device, and the RFID device is turned into power saving mode after the acknowledgement signal has been received. In one further embodiment the acknowledge message includes control information, and the RFID device is controlled in accordance with the transferred control information.

In another embodiment of the invention the length of the time period of power saving mode is measured and compared to a predetermined value of time, and the data transfer sequence is started after the predetermined period of time has lapsed.

In one embodiment an operating voltage/current is switched off from a processor, and/or from a receiver and/or from a transmitter of the RFID device during the power saving mode. In a further embodiment the operating voltage/current is switched off from all said circuits during the power saving mode. The RFID device may have a timer circuit for the switching of the operating voltage/current. This timer circuit is preferably separate from the processor circuit.

In a further embodiment of the invention a data transfer sequence comprises a signal strength monitoring period, a data transmission period and a period for receiving an acknowledgement message.

In one embodiment of the invention the signal received from a sensor corresponds to measured temperature, humidity, pressure, force, light, intensity of acoustic sound, acceleration, and/or on/off information.

Some further embodiments of the invention are described in dependent claims and in the following, detailed description.

The present invention offers important advantages over the prior art. The RFID device is not required to receive continuously data from the RF channel, so the receiver can remain in a power saving mode for a large percentage of time. In the power saving mode, the operating current may be switched off from the processor, receiver and transmitter circuits. This way low average power consumption is achieved. As a result, it is possible to use batteries of relatively small capacity, size and cost. Due to the non-frequent servicing requirement, it is also possible to achieve high functional reliability of the RFID device. Due to the long operating time and small size of a tag, it is also possible to install the RFID devices into locations in which servicing of the tag would be difficult. Also, the small size of the batteries as well as the non-frequent replacement requirement of the batteries decreases any possible impact on the environment.

It is also an advantage that the transmission of the data from an RFID device does not have to be dependent on the communications from a second device to the RFID device. For example, if there is some fault in the transmission function or ciphering function in the second device, or a fault in the receiving functions of the RFID device, it is still possible to transfer the acquired data from the RFID device to the second device. It is also not necessary to provide any registration of an RFID device into the network of the system. Thus any power consumption related to such functions can be avoided.

In this patent application term "RFID device" means a device which has a capability to transmit data, such as identity data or sensor data, to another device via wireless radio frequency channels. The term RFID device is mainly used to indicate an RFID tag, but according to its definition, RFID device may also be a master device or a router.

In this patent application term "RFID tag" means an RFID device, which has as its main purpose to transmit information of its own identification and/or other data stored in the memory of the RFID tag, and/or to transmit signal or other data received at its input(s).

In this patent application term "RF channel" means an RF frequency band wherein a concerned data is transferred. The term RF channel does not imply to any specific means of modulation or coding of the transferred signals.

In this patent application term "RF channel(s) of the system" means RF channels which are used in data transfer between RFID devices and other devices of the system, as well as corresponding RF channels that are used by any devices of the system.

BRIEF DESCRIPTION OF THE DRAWINGS

The described and other advantages of the invention will become apparent from the following detailed description and by referring to the drawings where.

DETAILED DESCRIPTION OF EMBODIMENTS

Figure 1:
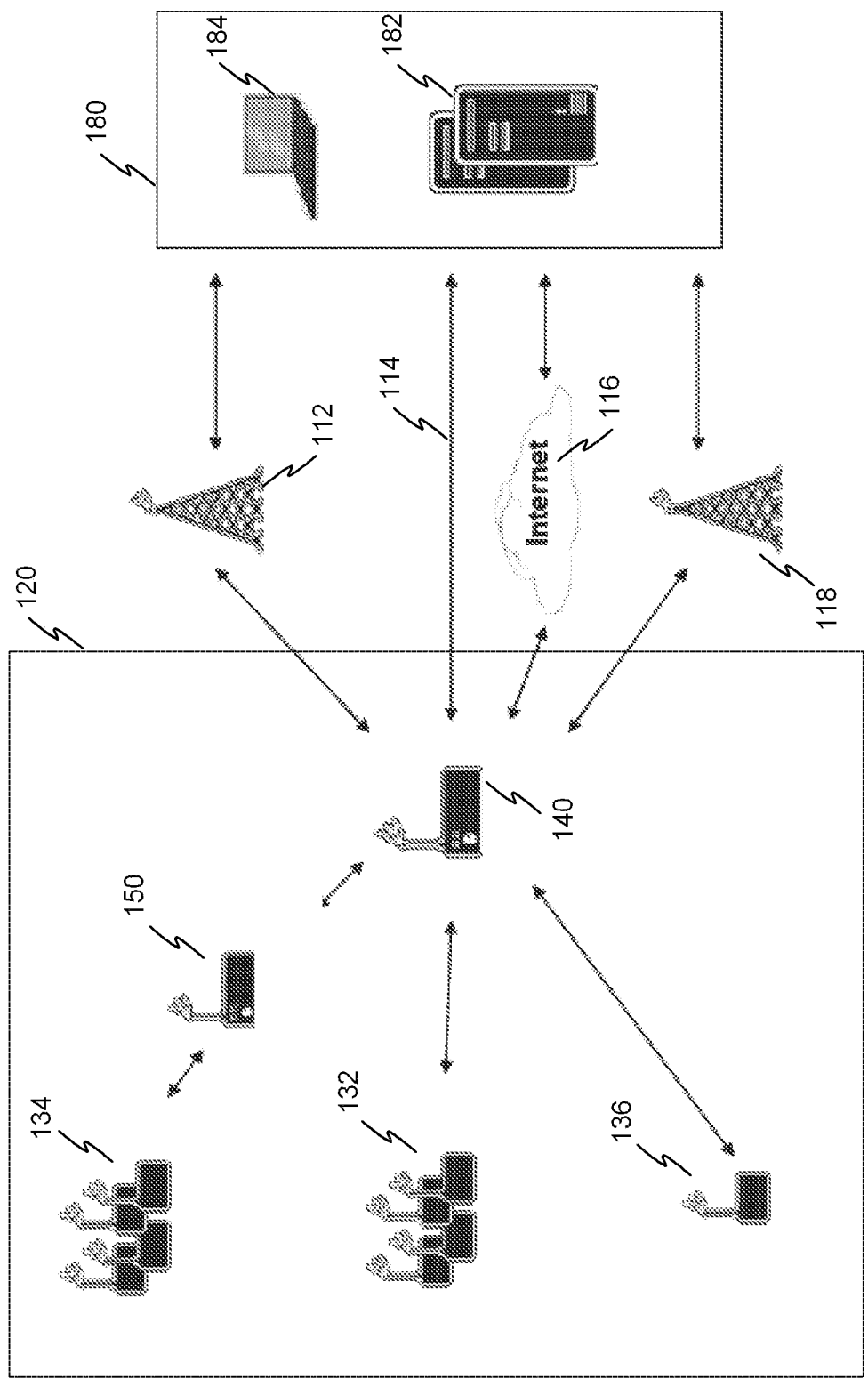
FIG. 1 illustrates an exemplary data acquisition system according to the invention.

FIG. 1 illustrates an exemplary embodiment of a system according to the invention. The system has a plurality of RFID devices such as RFID devices 132-136. The RFID devices communicate with a master device 140 and/or a router 150 of the system.

The system has a first group 132 of RFID devices which are located at such a distance from the master device that a normal transmission power of the RFID devices is sufficient for the communications with the master device.

The system also has a second group 134 of RFID devices which are located at such a distance that the normal transmission power of the RFID devices is not sufficient for the communications directly with the master device 140. For the communications the system also has a router device 150 which is located between the locations of the group 134 and the master device 140. The purpose of the router is to collect data from the group 134 of RFID devices and forward the data to the master device. The distance between the group of RFID devices 134 and the router 150 is such that normal transmission power of the RFID devices is sufficient for the direct communications with the router. Also, the distance between the router 150 and the master device 140 is such that mutual radio communication is possible with transmission power of the devices. It is also possible to install more than one router between RFID devices and the master device so that the data is transferred via several routers. This way it is possible to extend the operating coverage of the system.

The system also has a further RFID device 136, which is located at a long distance from the master device. In this case, the RFID device is equipped with an RF transmitter with higher transmission power than e.g. RFID devices 132-134. Thus it is able to communicate directly with the master device 140. In case of a single RFID device located at a long distance it may be preferable to use an RFID device with higher transmission power instead of installing one or several routers between the RFID device and the master device.

The RFID devices 132-136 preferably transmit regularly data to the master device. This data may include the identification information of the transmitting RFID device, measurement data from sensors connected to the RFID device, identification and/or other information on the sensors connected to the RFID device, other input data received from the connections of the RFID devices, and/or information relating to the operating status of the RFID device, such as charge level of a battery of the RFID device.

The RFID devices may be powered by batteries, and such RFID devices preferably have a power saving mode and an active mode. During the power saving mode of the RFID device the receiver of the RFID device is switched off or it has a lower capability to receive signals/information from the RF channel. During the power saving mode the RFID device has an active circuit which monitors time and/or some inputs of the RFID device. This circuit has a capability to wake the receiver into active mode after a predetermined time period of power saving mode has lapsed or if some other activation condition is fulfilled.

When the RFID device is turned into an active mode, a data transfer sequence is started. The RFID receiver monitors the signal strength on one or several RF channels. The measured signal strength is compared to a predetermined value, and the result of comparison determines whether the channel is reserved or free for data transmission. If an RF channel is free the RFID device transmits the data including e.g. identification, measurement or status data as described above.

The RF data transmission is received by another device of the system, such as the master device 140, the router device 150 or some other device which is preferably continuously in an active mode and has a capability to monitor or receive data continuously at one or possible several RF channel(s). The receiving device preferably detects the secured data from the received signal and checks the identity information on the received message to check that the data transmission is intended for the concerned device and that the data is received without errors. After receiving, detecting and checking the data the router or the master device transmits an acknowledge message to the RFID device. The acknowledge message is preferably transmitted on the same RF channel on which the data was received. Before the acknowledge message is transmitted, the master device/router may monitor the signal strength of the RF channel in order to check that the RF channel is free for the transmission.

After the acknowledge message is received at the RFID device, it may turn back into the power saving mode. However, it may be that the acknowledge signal is not received or that it includes status information meaning that the originally transmitted data was not successfully received at the master device/router. The RFID device has preferably functionality for retransmitting the data in such a case using a similar data transfer sequence as the first one. It is also possible that the second transmission is made using a higher RF transmission power than the first transmission. The RFID device or the master device/router may also monitor and/or keep statistics on the number of successful and failed data transmissions, and control the transmission power and/or the RF channel selected for transmission based on the collected information.

If the data transmission is received by a router, the router will forward the received data to the master device or to a next router. The forwarding data transmission may be performed using a similar data transfer sequence as was used in transferring the data from the RFID device to the router.

When the master device 140 receives data from the RFID devices 132-136 it stores the data in the memory thereof. Optionally the master device 140 may also process the data by executing filtering, encoding, or analysis actions, for example. The collected data is further transferred from the master device to a control center 180. The control center may include a server 182 with a database for storing and processing the data collected from the RFID devices/master device. The control center may also have a terminal device 184, such as a pc computer, for providing a user interface for processing the data and providing necessary information for the user of the control center.

It is possible to use several alternative types of communication for transferring collected data from the master device to the control center. It is possible to use wired data transfer, or similar wireless data transfer on an RF channel as is used between the RFID devices and the master device, 114. Those types of communication may be useful in cases where the master device is located near to the control center when the data is transferred. It is also possible to use wired Internet 116 for the data transfer. Further possibilities include wireless cellular networks 112, such as networks using GSM, GPRS or UMTS communication standards in the air interface. Further, it is possible to use a wireless local area network for collecting data in a wireless manner to a base station 118, where from the data can be forwarded to the control center via wired, Internet, cellular or any other network. It is also possible to use PSTN network for transferring the data. The above mentioned communication types can also be combined within the route of the data transfer.

It is possible that the data transfer between the master device and the control center is activated by the control center, or it is also possible that the data transfer is activated by the master device. The data transfer may be activated at regular intervals, it may be activated on the basis of the currently available communication services/channels, on the basis of the current status of memory capacity in the master device, or based on some other criteria. However, if the master device has collected an alarm status from an RFID device, router device or the master device itself, the master device may activate the data transfer to the control center as soon as a communication service is available.

The RF channel of the system can be used for activating the data transfer. In order to initiate the communications between the master device and the control center, it is possible that the master device transmits request messages at defined time intervals. These request messages may be transmitted on an RF channel of the system. When the master device enters the communication distance of a control center, the control center receives the request message of the master device. The control center then transmits communication parameters and other required commands preferably through the RF channel of the system. The data transfer may then start on e.g. WLAN connection. The transfer of collected data may still take place at a point of time which is determined by the control center.

It is also possible that the control center transmits activation messages as broadcast messages on determined time intervals. The activation messages are also preferably transmitted on the RF channel of the system. When a master device enters within the communication range of a control center the master device will receive an activation message and start communication with the control center. The transfer of collected data may then be initiated at a suitable point of time. In this embodiment the activation messages are transmitted by the control centers or their base stations, and the coverage area of these RF transmissions is thus limited to the vicinity of the control centers or their base stations. On the other hand, if request messages are regularly transmitted by the master device, the RF transmission is spread into any areas where the master devices may travel. Therefore, the embodiment where the control center transmits activation messages causes a load on the RF channel which is more local than the embodiment where request messages are transmitted by the master device.

In one embodiment of the invention both the data transfer from the RFID devices to the master device as well as the data transfer from the master device to the control center are activated from outside the master device. In this embodiment, data transfer sequence from an RFID device (or router) to the master device is initiated from the RFID device/router, i.e. the RFID device/router provides the first transmission of the sequence. In the embodiment, the data transfer from the master device to the control center is initiated from the control center or some other point between the master device and the control center. The control center may first transmit an activation message allowing the master device to start data transfer immediately or on a defined point of time. When data transfer is initiated with transmission from outside the master device, it is possible to achieve an efficient use of data communications capacity as well as efficient use of power supplies.

In one further embodiment of the invention, the master device 140, the routers 150, and the RFID devices 132-136 are similar modules or they are made of similar modular components. The actual functions of the devices can be achieved by program, i.e. through different software or different parameters guiding the functioning of the software. The functions are preferably remotely controllable via wireless or wired connections of the devices.

As mentioned above, the RFID devices preferably have an individual identification code, which is stored in the memory of the RFID device. The length of the individual identification code may depend on the number of devices included in the system. However, it is possible that similar systems are used by different users, and that devices of two systems sometimes locate near to each other. Therefore, it is preferable to form the identification code to include an individual code and a group/system code. The RFID devices which belong to a same group/system then have the same group/system code, but different individual codes. The RFID devices of different groups/systems have a different group/system code. If, for example, two vehicles include RFID devices belonging to different systems, the transmitted data can only be received by the correct receiving device which has a same system identification code.

It is useful that identification information is stored except as a code, also as a short domain name that is linked with the concerned code. Such a short domain name is a descriptive name whereas the identification code is a string of characters usually without any meaning as a word. For example, the short domain name could be "container 455", which can be understood by someone who handles the containers and reads the information of the RFID tags of the containers. This stored short domain name can be changed if the location of the RFID tag is changed. On the other hand, the RFID tags may still have a stored identification code which is used for identification of the devices in the communication procedures of the data acquisition system.

A further means for preventing unauthorized receipt of transmitted data is encryption. The data to be transmitted is preferably encrypted using a ciphering key, which is unique for each system or subsystem. As such, various ciphering methods are known by a person skilled in the art, and such a person can implement ciphering without further description.

Figure 2A:
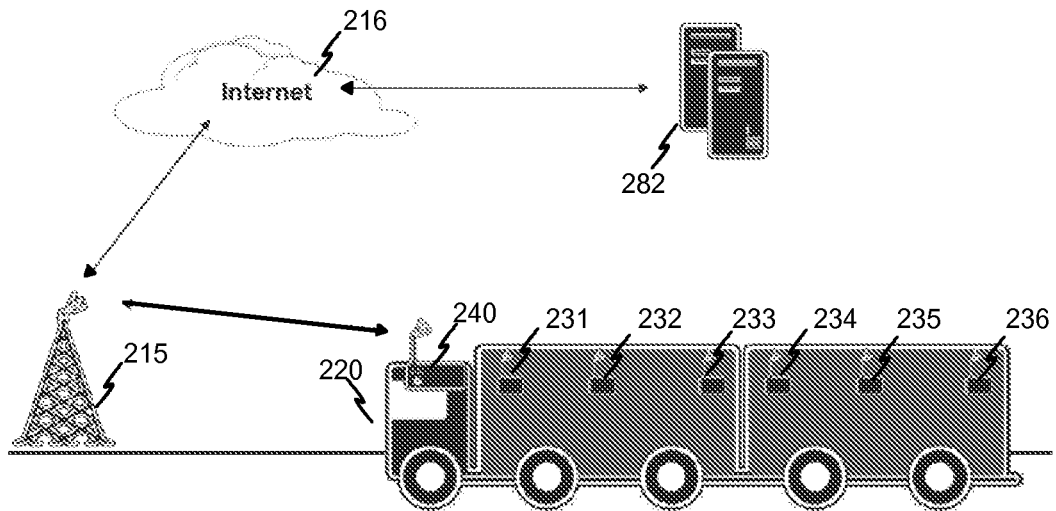
FIG. 2a illustrates an exemplary logistics application for a data acquisition system according to the invention.

FIG. 2a illustrates as an example a logistics application of a system according to the invention. A plurality of RFID devices 231-240 is located within a vehicle such as a truck 220. The RFID devices 231-236 act as tags and may be directly attached to target objects, e.g. products that are being transported by the truck 220 or to the cargo space itself. In the cargo space the RFID tags can be attached e.g. to ceiling, floor, or walls thereof, so that they provide information on the conditions prevailing in the neighborhood of transported goods during the transportation.

A master device 240 receives data from the plurality of RFID tags 231-236 and stores it in the memory thereof. Optionally the master device 220 may also process the data by executing filtering, encoding, or analysis actions, for example. The master device 240 communicates with the plurality of RFID tags 231-236 through a radio frequency technology in accordance with the present invention. The RFID tags preferably transmit regularly data to the master device. This data may include the identification information of the transmitting RFID device, measurement data from sensors connected to the RFID device, identification and/or other information on the sensors connected to the RFID device, other input data received from the connections of the RFID devices, and/or information relating to the operating status of the RFID device, such as charge level of a battery of the RFID device. The master device 240 includes an RF receiver to capture the transmissions of the RFID tags 231-236, and a transmitter so that acknowledgments and possible control messages can also be transferred towards the RFID tags 231-236. The RF data transfer sequence is further described in the description of FIGS. 1, 4a and 4b.

The master device 220 transmits the collected data to a server computer 282 of a control center. Various types of communication can be used for the data transfer from the master device to the control center, as was described in the description of FIG. 1 above. For example, it is possible to use a WLAN data transfer between the master device 240 and a WLAN base station 215, and the data may be further transferred to the control center 282 via Internet wherein the base station is connected.

Figure 2B:
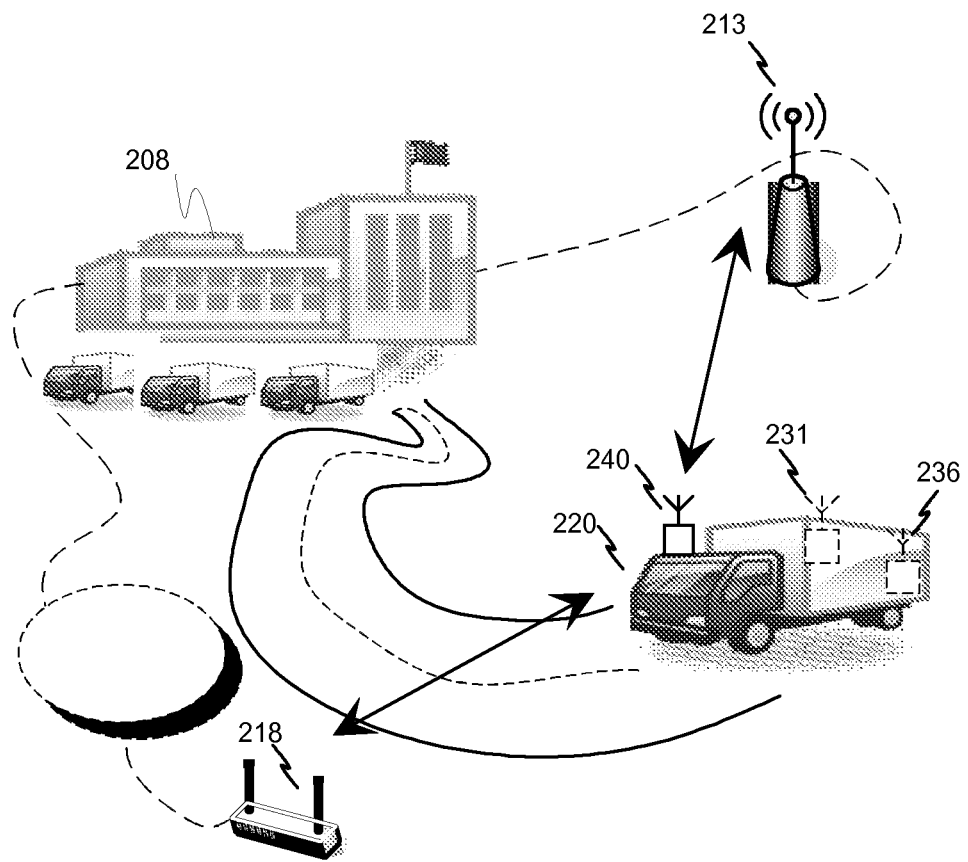
FIG. 2b illustrates a further embodiment of an exemplary logistics application for a data acquisition system according to the invention.

FIG. 2b illustrates an exemplary embodiment of a logistics application for a system according to the invention. This embodiment is a further development in relation to the embodiment of FIG. 2a in relation to the communications between a master device and a control center. A master device 240 and a plurality of RFID tags 231-236 are located within a vehicle 220. The communication between the master device and the RFID tags may implemented according to the invention as was described above. A master device 240 receives data from the plurality of RFID tags 231-236 and stores it in the memory thereof. Optionally the master device 240 may also process the data. The master device 240 includes an RF receiver to capture the transmissions of the RFID tags 231-236, and a transmitter so that acknowledgments and control messages can also be directed towards the tags 231-236. The RF transmitter and receiver may be combined to form a transceiver device.

Further, the master device 240 includes another transceiver, preferably according to a desired standard, so that upon entering a suitable time instant the data received from the tags 231-236 can be forwarded as such or in a processed form to a remote entity 218. The remote entity may be e.g. a remote WLAN transceiver, such as an access point or a WLAN router. The data it is further funneled to a logistics center/terminal 208 and/or to a further control center for analysis and/or control purposes. The remote WLAN transceiver 218 may reside within or at least functionally connected to the terminal of the logistics center 208. In a latter case it may reside connected to the Internet (note the exemplary dotted network entity in the figure), for example. The data provided over the WLAN may be stored in one or more databases and information systems of relevant entities, such as the logistics center 208 or a further control center. For example, the utilized WLAN standard by the IEEE (Institute of Electrical and Electronics Engineers) may be selected from a group consisting of: 802.11, 802.11a, 802.11b, 802.11g, and 802.11n. Further, one or more of the extensions: 802.11e, 802.11F, 802.11d, 802.11h, 802.11i, and 802.11s may be used. Alternatively, Hiperlan 1 or 2 standards by ETSI (European Telecommunications Standards Institute) or any other suitable WLAN specification may be applied. The transceivers may support one or more WLAN specifications, whereupon a specific one can be selected for use via signaling over the RF connection.

It is possible that the data transfer between the master device and the control center is activated by the control center, or it is also possible that the data transfer is activated by the master device. In the system of FIG. 2b the data transfer is activated by the control center using the RF channel of the system. In order to initiate the communications between the master device and the control center, the control center transmits activation messages as broadcast messages on determined time intervals. The activation messages are transmitted on the RF channel of the system. When a master device enters within the communication range of a control center the master device will receive an activation message and start communication with the control center. The transfer of collected data may then be initiated at a suitable point of time.

In one embodiment the suitable time instant can be solely or at least partially determined by an entity that controls sending of the activation message via the radio frequency transceiver or transmitter 213. The entity may be or at least reside within or functionally connected to the logistics center/terminal 208 so that it advantageously obtains knowledge about the suitable time instant (e.g. vacant time period not already used or allocated to other master devices) and optionally about suitable connection parameters for WLAN communication from the WLAN infrastructure or transceiver 218, for example. Same entity, e.g. logistics control system of center 208, may ultimately control both RF and WLAN connections between the master devices and the center, and also receive the data transmitted by the master devices.

In one embodiment the activation signal is a message or e.g. a command or a parameter value in a message configured to immediately trigger data transmission between the master device 104 and the WLAN transceiver 218. In another embodiment the activation signal determines a time slot or instant in the future upon which the transmission over the WLAN should take place. The master device 240 may then comprise a clock or a timer functionality to locally take of starting the transmission according to the received instructions.

In one embodiment the activation signal determines a number of WLAN connection parameters instead of or in addition to the immediate triggering/delayed triggering function. Issuing connection parameters, e.g. used WLAN version information, password, login ID, or encryption information, may enable a connection set-up to the WLAN network whereto connection establishment without the given parameters would have been either impossible or difficult by the master device 240.

The RF transfer method (e.g. communication parameters such as frequency and modulation, or other settings) used for communication between the transceiver 213 and the master device 240 may be similar to the technology used in the communication between the RFID tags 231-236 and the master device 240. Alternatively, these two types of transmissions may follow different scheme and require different software, software parameters, hardware (in the transceiver/receiver 204), or both. For example, in one embodiment the radio frequency communication from transmitter 213 utilizes relatively long-range, universal cellular standard such as GSM (Global System for Mobile Communications), GPRS (General Packet Radio Service), or UMTS (Universal Mobile Telecommunications System), whereas the transmissions by the RFID tags 106 follow a proprietary, shorter range and lower power consumption communication technique. In another embodiment both the transmission types utilize the same RF communication method, e.g. the proprietary one.

Figure 3:
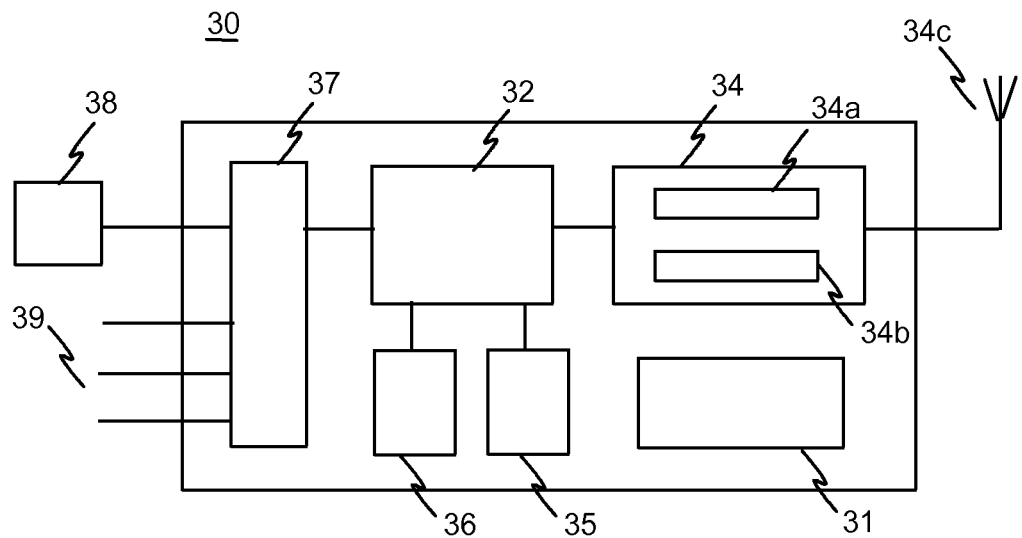
FIG. 3 illustrates a block diagram for an exemplary RFID device according to the invention.

FIG. 3 illustrates an exemplary embodiment of an RFID tag 30 according to the invention. The device has a processor 32 for controlling the functionalities of the device. For example, the processor controls the data transfer sequence and measurements from the sensor inputs and other inputs of the device. A memory 35 is connected to the processor, whereby the memory stores e.g. the program for the processor, identification information of the tag, and collected measurement data. The device also has a timer device 36 for timing the operational modes of the device. The memory and the timer may be included in the processor or they may be separate circuits.

If the timer is included in the processor, the timer function of the processor remains active during the power saving mode, and thus substantial parts of the processor need to remain powered. Therefore the current consumption of the processor is not reduced very low. It is also possible that the timer is a circuit which is separate from other components of the device or integrated to some other component such as a sensor. The timer may be implemented with analog or digital components. An analog timer may be implemented with e.g. a resistor-capacitor (RC) timing circuit and transistor(s), and a digital timer may be implemented with e.g. clock and counter circuits. If such a timer circuit is used, it is possible to set the processor and other components into a mode where their current consumption is minimal or zero. It is actually possible to switch off the operating voltage/current from the processor and/or receiver circuit and/or transmitter circuit, and possibly other components during the power saving mode, and thus to achieve a zero current consumption in those parts. The timer circuit may switch off the operating voltage from all said circuits except the timer circuit itself. A similar effect may be achieved in the processor by stopping all processing activity of the processor by some other control. This allows a very small average power consumption of an RFID device. It should be noted, that instead of a timer, the RFID device can be activated into the active mode also with a signal received e.g. from a sensor or a switch. Such a sensor or switch may also switch off the operating voltage from said circuits during the power saving mode. "Switching off an operating voltage/current during the power saving mode" means here that there is a time period during the power saving mode wherein the operating voltage/current is switched off. This time period is preferably equal to the period of the power saving mode.

If a processor based or other digital timer is used, it is generally possible to adjust the length of the time period of the power saving mode with a stored parameter. It is possible that the parameter is controlled by the system. If the timer is based on an analog circuit the length of the time period is preferably fixed. It is useful if the length of the time period is adjusted to be at least slightly different between individual RFID devices. This way it is possible to avoid situations where a number of RFID devices would start transmission substantially at the same time in several successive transmission sequences. Further, if a master unit or other second device transmits a broadcast request message for several active RFID devices simultaneously, it is useful that the RFID devices send a response at slightly different points of time in order to avoid overlapping of transmissions.

It is possible to achieve individual time delays for the RFID devices by determining the length of a delay on the basis of the identification code of an RFID device. For example, the time delay may be calculated as a constant delay added by a delay which is e.g. linearly dependent on the number string of the identity code.

By using individual delays in transmission, it is possible to avoid retransmissions and thus to save energy consumption in RF devices, such as RF tags.

The device of FIG. 3 has an interface 37 for sensors 38 and other possible inputs 39. The device may include one or several integral sensors, and/or the sensor(s) may be connected externally to the device. The inputs may also serve as connections for switches or on/off sensors. The processor measures the signal values at the inputs and stores the values in the memory. When data is transmitted from the RFID tag, the processor reads the measurement results from the memory and includes the data in the signal to be transmitted on the RF channel. The processor may alternatively transmit the measurement data directly without storing the data in the memory.

If there are digital sensors connected to the inputs of the RFID tag the processor may be able to read the inputs without conversion. However, if the sensors provide an analog output the RFID tag preferably includes an A/D converter at the input of the RFID tag in order to convert the analog sensor signal into a digital signal for the processor input.

The device further includes an RF transceiver 34 for providing wireless communications with other parts of the system, such as master device or router device. The transceiver has a transmitter 34a and a receiver 34b. The transceiver is connected to an RF antenna 34c, which may be an integral part of the device or it may be an external antenna connected to the transceiver. The RF receiver has two operating modes; in active mode the receiver has ability to receive signals/data from the RF channel, and in the power saving mode the receiver has no ability to receive data from the RF channel or the ability is lower than in its active mode. Also, the transmitter preferably has an active mode and a power saving mode. The transmitter can be e.g. controlled into active mode during the transmission and into the power saving mode during other periods.

The operating modes of the receiver and transmitter may be controlled by the processor, for example. However, the processor is preferably also set into a power saving mode between the data transfer sequences and measurements of inputs. Therefore, the timing circuit of the RFID tag may initiate the change from power saving mode into the active mode. Alternatively, the change of mode may be initiated by an input of the RFID tag, such as sensor input or on/off input. For this purpose, the RFID tag may include a monitoring circuit which is powered during the power saving mode of the processor and which measures one or several inputs of the RFID tag during the power saving mode. The monitoring circuit is then arranged to change control the unit(s) of the RFID tag into active mode when the signal value at the input exceeds a predetermined value, or alternatively when the signal value goes below a predetermined value.

The device is powered with a battery 31, which may be rechargeable or disposable.

Figure 4A:
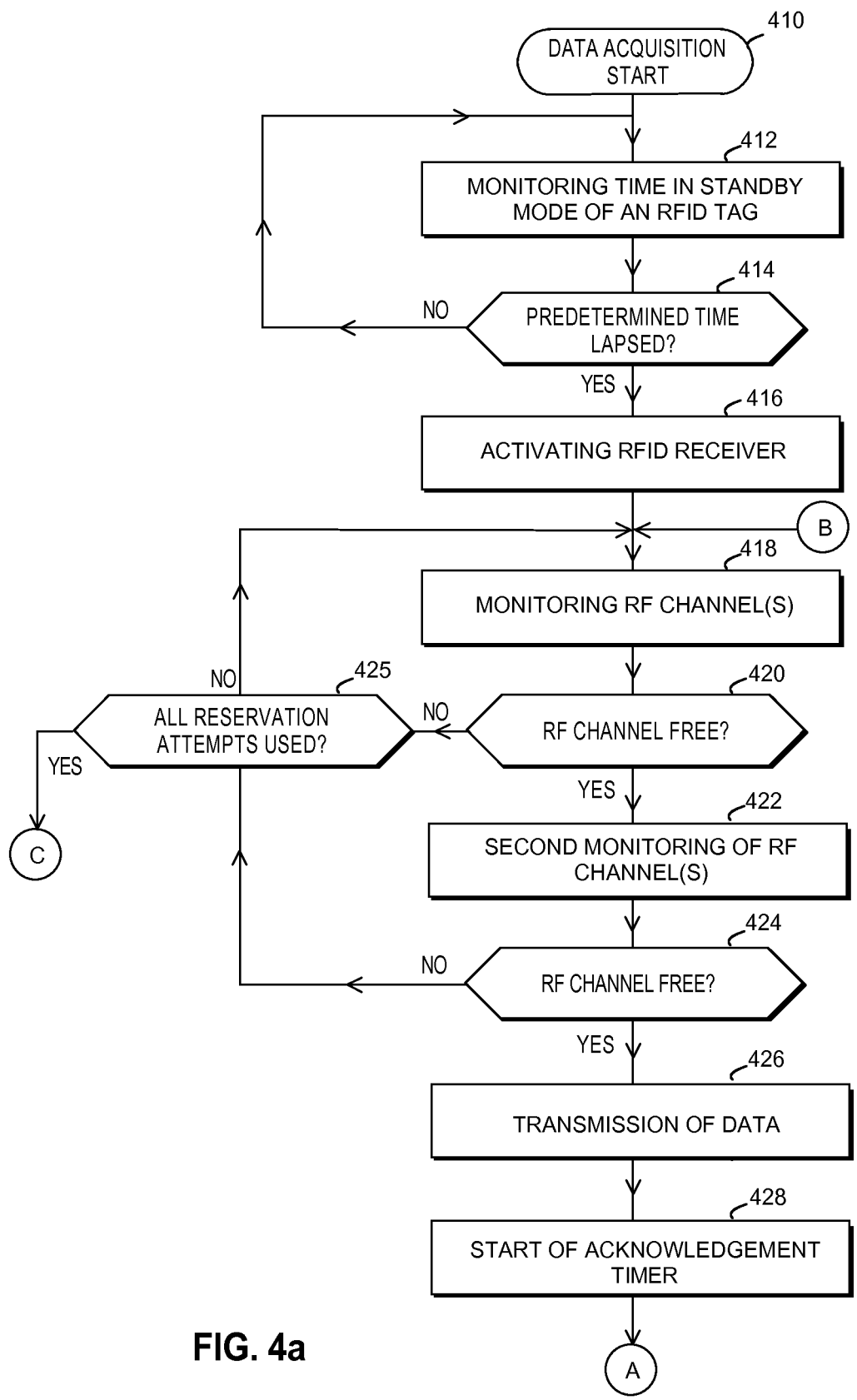
FIG. 4a illustrates a first part of a flow diagram for an exemplary method according to the invention.
Figure 4B:
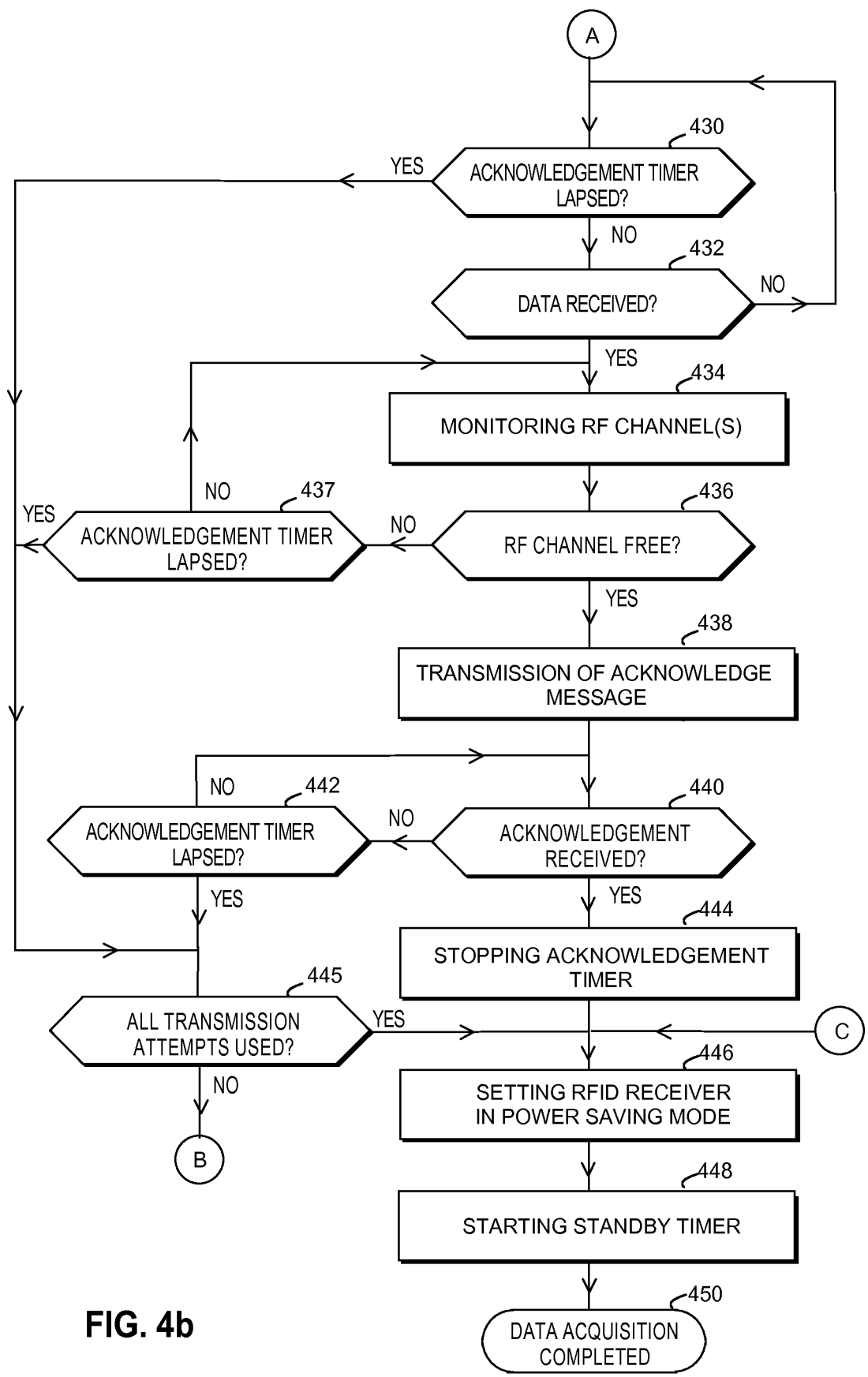
FIG. 4b illustrates a second part of a flow diagram for an exemplary method according to the invention.

FIGS. 4a and 4b illustrate a flow diagram for an exemplary method according to the invention. In this method, data acquisition is performed from an RFID tag, 410. The data transmission is received by another device of the system, such as a master device, a router device or some other device which is constantly in an active mode and receives continuously data at the RF channel(s).

During a power saving mode of the RFID tag it monitors how long time has lapsed since the start of the power saving mode, phase 412. A predetermined value of time has been stored in the RFID tag determining the length of the power saving period. The monitoring of time is continued until the predetermined length of time has lapsed, 414, whereafter RFID receiver is activated, 416. Alternatively, the RFID receiver may be activated caused by a monitoring circuit as was described above.

After turning into active mode, the RFID tag may first measure signals from sensors that are included or connected to the RFID tag, and it may also poll states of the possible switches of the RFID tag. After possible processing of this signal data, it may store the data for transmission to a second device.

Next the RFID receiver monitors the signal strength of one or several RF channels in phase 418. If the value of signal strength intensity exceeds a predetermined level, the channel is considered to be reserved for transmission of another device located nearby. It will be checked by the RFID tag whether the maximum number of transmission reservation attempts has been used in phase 425. It may be determined with a corresponding parameter that the RFID tag will make a predetermined number of reservation attempts by monitoring the RF channel, but when the maximum number of transmission attempts has been made the RFID tag will return to the power saving mode, 446. The maximum number of attempts during an active mode period may be e.g. 5 attempts. If all transmission attempts have not been used in phase 425 the RFID tag will make a new reservation attempt by monitoring RF channel in phase 418. If more than one RF channel is available, it is also possible that in the successive reservation attempts are made by monitoring different RF channels. This way it is possible to find a free one of the several RF channels for the data transmission. The number of reservation attempts is preferably calculated by the processor of the RFID tag.

If the signal strength does not exceed the predetermined level, the channel is considered to be free at that moment, 420. However, it is preferable in this case to provide a second monitoring period, 422. Again, if the value of signal strength exceeds a predetermined level, the channel is considered to be reserved for transmission of another device, and it will be checked whether all reservation attempts have been used in phase 425. But if the signal strength does not exceed the predetermined level, the channel is considered to be free for transmission, 424.

The RFID tag then starts transmission of data, phase 426. After the data has been transmitted the RFID tag starts an acknowledgement timer, 428. The lapsed time is monitored until an acknowledge message is received by the RFID tag receiver or until a predetermined amount of time has lapsed since starting the timer. If, for example, no second device for which the data is intended receives the transmitted data, 432, the RFID tag does not receive an acknowledgement signal until the acknowledgement timer lapses, 430.

If the data transmitted by the RFID tag is received by a second device, 432, the data will be detected, and if the detected data includes a correct address, the rest of the data is decrypted. The identity information of the data preferably includes the identity code of the first device which transmitted the message, and it may also include identity information concerning the intended receiving device for the message. If the receiving device is programmed to process messages with the detected identity information, it will store and/or forward the message data, and send an acknowledge message to the RFID tag. The receiving device also checks the checksum of the received data in order to verify that the data is correctly received. These procedures are included in phase 432 of FIG. 4b.

In order to transmit an acknowledge message, the signal strength on the RF channel may be first monitored by the second device which received the data message from the RFID tag, phase 434. Monitoring the RSSI level may be necessary if the second device is a router. It is possible that the final destination or a further router has also received the data from the RFID tag, and such a device may also send an acknowledge message. Therefore, it is useful that a router first monitors that the RF channel is free before transmitting the acknowledge message. Also, it is possible that the second device detects the information of a possible received acknowledge message from another device, and if it appears that a final or further destination in a data transfer link has received the data from the RFID tag, then the second device may not forward the data or send its acknowledge message. Further, in order to avoid simultaneous transmission of acknowledge messages, it may be useful that the timing for the transmission of the acknowledge message is individual for the devices. The timing may be a function of the individual identification codes of the devices, for example.

If it is probable that only one second device, such as a master device, will receive the transmitted data, it may be unnecessary to monitor the RF channel prior to sending the acknowledge message. If the acknowledge signal is transmitted with a small or no delay after receiving the data from the RFID tag, other devices/tags of the system have not started transmissions on the RF channel because according to their monitoring of the RF channel the channel is reserved.

The flow diagram of FIG. 4b shows the monitoring of signal strength on the RF channel. If the signal strength exceeds a predetermined level, the RF channel is considered to be reserved in phase 436, and the transmission of the acknowledge message is delayed and the monitoring is continued in phase 436. If the channel remains reserved for a long period of time, it is possible that the acknowledgement timer lapses, 437.

If the value of the signal strength is below the determined level, the RF channel is considered to be free for transmission, 436, and an acknowledge message is then transmitted to the RFID tag, phase 438. If the RFID tag does not receive the acknowledge message, 440, it will wait until the acknowledgement timer has lapsed, 442. If the acknowledgement timer lapses before any acknowledge message has been received by the RFID tag, phases 430, 437 or 442, it will be checked by the RFID tag whether the maximum number of data transmission attempts has been used in phase 445. It may be determined with a corresponding parameter that the RFID tag will make a predetermined number of transmissions, but when the maximum number of transmission attempts has been made the RFID tag will return to the power saving mode, 446. The maximum number of attempts during an active mode period may be e.g. 3 attempts. If all transmission attempts have not been used in phase 445 the RFID tag will start a new data transmission sequence at phase 418. The number of transmission attempts is preferably calculated by the processor of the RFID tag.

If the RFID tag receives the acknowledge message in phase 440, it checks the data of the message. If the data of the acknowledge message shows that the original data message was successfully received by the second device, the RFID tag stops the acknowledgement timer, turns into power saving mode, 446, and starts the standby timer, 448. The data acquisition is thus completed, 450.

During the power saving mode the timer circuit of the RFID tag remains functional, and the timer will cause the RFID tag to turn into active mode again after a predetermined period of time has lapsed. Alternatively it is also possible that the RFID tag is turned into active mode triggered by activation signal which may be received from a sensor circuit or a switch, for example. Such an activation signal may be an analog signal or a digital signal.

Figure 5:
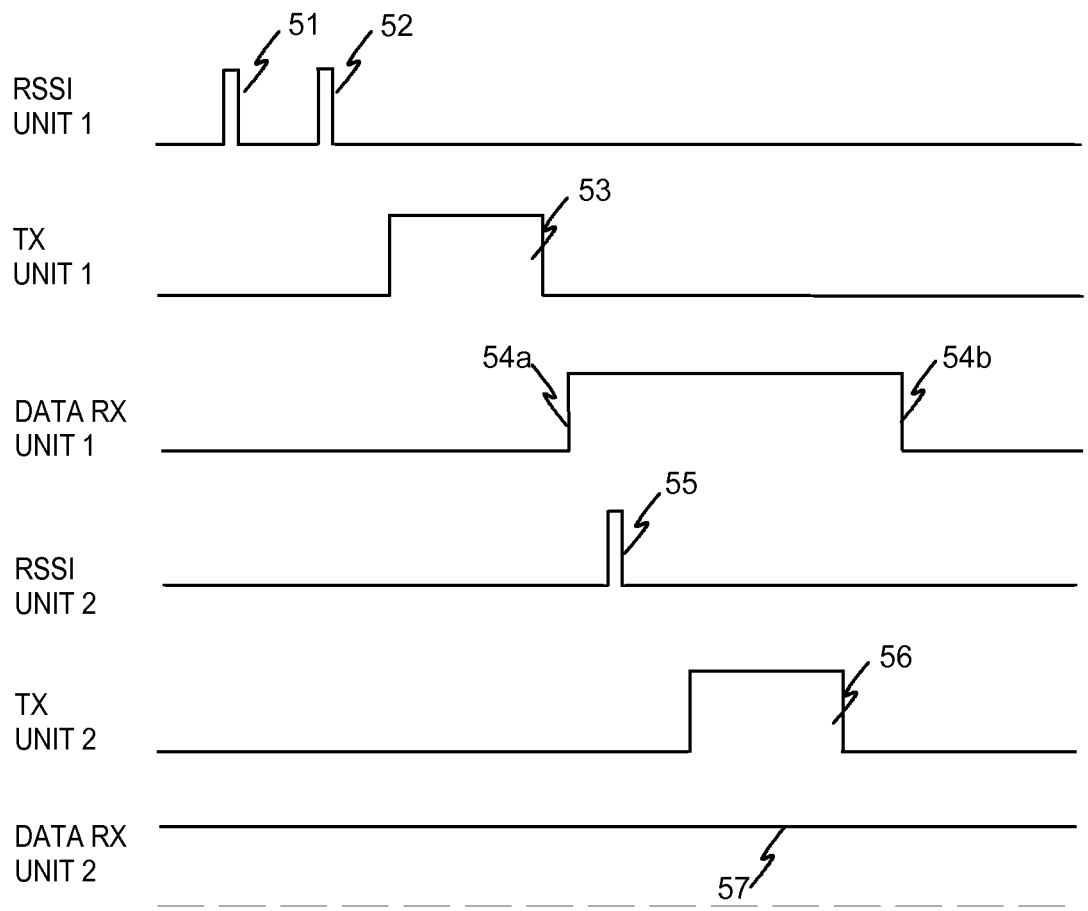
FIG. 5 illustrates a timing diagram for an exemplary data transfer sequence in a method and a system according to the invention.

FIG. 5 illustrates a timing diagram of data transfer between devices of an exemplary system according to the invention. In this diagram the first device is an RFID tag which is powered with a battery and which alternates between active mode and power saving mode. The second device is a router or a master device which is constantly in an active mode and receives continuously data at the RF channel(s).

When the first device turns into active mode, it may first perform sensor measurements (not shown in FIG. 5). The first device monitors the signal strength of the RF channel with its receiver circuit, 51. This monitoring can be simultaneous or successive with sensor measurements. If the value of signal strength intensity exceeds a predetermined level, the channel is considered to be reserved for transmission of another device located nearby. In this case the device may return to power saving mode for a determined period of time. If the signal strength does not exceed the predetermined level, the channel is considered to be free at that moment. However, it is preferable in this case to provide a second monitoring period, 52. Again, if the value of signal strength exceeds a predetermined level, the channel is considered to be reserved for transmission of another device. But if the signal strength does not exceed the predetermined level, the channel is considered to be free for transmission.

When the first device monitors the RF channel, it is possible that there exists communication between two other devices of the system, but in such communications there may be short periods without transmission. Therefore, during the first monitoring period low signal strength may be measured even if there is an ongoing communications sequence on the RF channel. Therefore, it is preferable to use two or several successive monitoring periods. The time gap between the successive monitoring periods is preferably selected in such a way that during a normal communication sequence between two devices, such as an RFID tag and a master device, at least one of the two monitoring periods would always overlap with transmissions of such communication, if the monitoring periods are within the communications sequence. When such a selection is used, the probability is low for overlapping transmissions of two devices within the same RF channel. Instead of two separate monitoring periods, it is possible to use one monitoring period the length of which corresponds to said two successive monitoring periods including the time gap between the time periods. However, using a long monitoring period tends to require a higher amount of operating energy than using two short monitoring periods.

When the first device has monitored the RF channel to be free for transmission. the first device next starts transmission of data, 53. The second device has a continuously active reception, 57, so it is able to receive the data transmitted from the first device. It is useful that, during the reception of the data from the first device, the second device will measure the signal strength at the RF channel of reception. This way it is possible to assess whether the transmission power of the first device is in a suitable range. The second device may then inform the signal strength value to the first device in a later message, such as the acknowledge message or a separate message. Using this information, the first device may adjust the transmission power in its following transmissions to the second device into a suitable range.

The second device will check the identity information of the received message. The identity information includes the identity code of the first device which transmitted the message, and it may also include identity information concerning receiving device the intended for the message. If the second device is programmed to process messages with the detected identity information, it will store and/or forward the message data, and send an acknowledge message to the first device.

After the first device has transmitted the data message, it turns its receiver active, 54a, for reception of an acknowledgement message. After receiving the data message from the first device, the second device may possibly monitor the signal strength on the RF channel, 55, before transmitting an acknowledge message as described in the description of FIG. 4b. If signal strength is measured and the signal strength exceeds a predetermined level, the RF channel is considered to be reserved, and the second device will delay the transmission of the acknowledge message. If the signal strength is below the determined level, the second device considers the RF channel to be free for transmission and transmits an acknowledge message to the first device, 56. The first device will check the data of the received acknowledge message. If the data shows that the original data message was successfully received by the second device, the first device will turn into power saving mode, 54b.

During the power saving mode the timer circuit of the first device remains functional, and the timer will cause the first device to turn into active mode again after a predetermined period of time has lapsed.

It is possible that the acknowledge message includes only such information which is required for informing the first device that the data message has been received and detected by the second device. Such information may include an acknowledge status byte and address data which identifies the sender and receiver of the message. However, it is also possible that the acknowledge message also includes other data. Such other data may be e.g. parameters which control the first device. These parameters may include e.g. length of power saving time periods, timing of a following active period or data transmission, timing of sensor measurements, information on which sensors are measured or a short domain name. The parameters may also include the maximum number of reservation attempts for an RF channel within one active period, and the maximum number of repeated data transmissions if an acknowledge message is not received by the first device. Further, the second device may transmit information on signal strength measurements concerning the data transmission from the first device.

It is also possible that parameters or other further information is transferred to the first device in a separate message. In such a case it is useful to include in the acknowledge message a request that the first device should remain in the active mode in order to receive a further separate message. This request can be included within the acknowledge message in form of control bit(s), for example. The first device may then remain in the active mode for a predetermined time, such as 10 seconds, or until it has received and possibly processed the separate message. Such a separate message including the parameters/other further information will be transferred from the second device to the first device after transferring the acknowledge message. In this way it is possible to update the parameters of the first device, such as an RFID tag, in connection with a normal periodical data transfer sequence. This way it is also possible to transfer the parameters/other control information to RFID tags when a data acquisition system is installed.

It is useful that, during the reception of the acknowledge message or other message from the second device, the first device will measure the signal strength at the RF channel of reception. This way it is possible to assess whether the transmission power of the second device is in a suitable range. The first device may then inform the signal strength value to the second device in a later data transfer. Using this information, the second device may adjust the transmission power in its following transmissions to the first device into a suitable range.

As was shown in the description of FIG. 5, it is possible that the RF receiver of an RF device, such as an RF tag, is in an active state only during a part of the data transfer sequence. Also, the transmitter of the device may also be in an active state only during the RF transmission. However, the processor is usefully in an active state during the whole data transfer sequence, including during possible measurements of sensors. Therefore, while in the power saving mode, all of these units, processor, RF receiver, RF transmitter, are in a power saving mode, they may all be in an active mode during the whole data transfer sequence. It is thus possible to determine sub-periods within the active mode of the RF device, such as RF monitoring/receiving sub-period and RF transmission sub-period.

During the power saving mode, it is possible that the RF receiver can receive/monitor RF signals but with a lower sensitivity than in the active mode of the RF receiver. Thus the power consumption of the RF receiver would be smaller than in the active mode, but during the power saving mode it would be possible to wake the RF device into an active mode with an RF signal which has an intensity exceeding a predetermined threshold value. However, in order to achieve a minimal power consumption during the power saving mode, it is useful that the RF receiver is in an off state, not having an ability to monitor or receive RF signals.

It should also be noted that data transfer according to the flow diagrams of FIGS. 4a and 4b or according timing diagram of FIG. 5 may also be used in other data transfer within the system. It may be used e.g. between a master device and a router device or between two successive or parallel router devices. It can also be used between two RFID tags if the RFID tag serving as a second device has a continuously powered/activated receiver. Further, the data transfer can be used between a master device and a control center.

In this patent specification the structure of the various components of the system and devices is not described in more detail as they can be implemented using the description above and the general knowledge of a person skilled in the art.

The control of functions in the devices generally takes place in an arrangement of processing capacity in the form of microprocessor(s) and memory in the form of memory circuits. To convert a known device or system into equipment according to the invention it may be necessary, in addition to the hardware modifications, to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

Above, only some embodiments of the solution according to the invention have been described. The principle according to the invention can naturally be modified within the frame of the scope defined by the claims, for example, by modification of the details of the implementation and ranges of use.

For example, the receiver may include a plurality of receiver circuits which may function independently on same or different RF channels. In a correspond manner, the transmitter may include a plurality of transmitter circuits.

Above, it has been mainly discussed on applications where RFID devices are used for identifying and monitoring goods and their environment in vehicles. However, it must be understood that the present invention can be applied as well in various other applications. Such applications include e.g. monitoring presence and location of workers, patients etc. in establishments and other premises. Monitoring environment and other various measurable variables in factories and machinery is also possible. The measurable variables include temperature, vibration, acoustic noise and humidity as a few examples. The variables may also include optical, electric or chemical variables such as power consumption of a machine, or concentration of various substances in the environment or industrial processes.

The invention claimed is:

1. A system for acquisition of data, the system comprising:
   a plurality of RFID devices, each RFID device comprising a processor, a receiver circuit, a transmitter circuit, and a timer device;
   at least one second device that communicates with said RFID devices, said second device being one of the group consisting of i) a router ii) a master device,
   wherein each said RFID device is configured to transfer data, on RF channel, to said second device,
   wherein said second device is configured to transfer an acknowledge message, on the RF channel, to each said RFID device responsive to receipt of the transferred data,
   wherein each RFID device has an active mode and a power saving mode,
   wherein in the power saving mode of the RFID device its capability to receive data on the RF channel is lower than in a monitoring and/or receiving period of the active mode, the timer device of each RFID device switching off an operating voltage of the processor, the receiver circuit, and the transmitter circuit in the power saving mode, the timing device remaining active during the power saving mode, and
   wherein at least one of the RFID devices and the second device monitor RF signal strength on the RF channel, and the transfer of said data and/or acknowledge message is dependent on the value of the indicated signal strength.

2. The system according to claim 1, wherein,
   the RFID device comprises an input for receiving a signal from a sensor, and
   the transmitter circuit includes information on said signal in the data to be transferred to a second device.

3. The system according to claim 1, wherein the second device monitors the RF signal strength on the RF channel and the acknowledge message is dependent on the value of the indicated signal strength.

4. The system according to claim 1, wherein,
the RFID device monitors the RF signal strength on the RF channel and the transfer of said data is dependent on the value of the indicated signal strength, and
the RFID device monitors the RF channel to provide the monitoring during two successive time periods within an active mode period.

5. The system according to claim 1, wherein the RFID device monitors signal strength on the RF channel when the receiver is in the active mode to determine whether communications exceeds a predetermined level.

6. The system according to claim 5, wherein the RFID device is adapted to transmit the data on the RF channel depending on whether the communications activity on the RF channel exceeds the predetermined level.

7. The system according to claim 1, wherein the RFID device is adapted to receive an acknowledgement message after the transmission of data, and the RFID device is further adapted to switch into power saving mode after the acknowledgement signal has been received.

8. The system according to claim 1, wherein the timer circuit measures the length of the time period of power saving mode and turns into an active mode after a predetermined period of time has lapsed.

9. The system according to claim 1, wherein a data transfer sequence of the active mode comprises a monitoring period, a data transmission period and a period for receiving an acknowledgement message.

10. The system according to claim 1, wherein the system comprises a control center that receives and stores collected data received from the second device.

11. The system according to claim 1, wherein the data transfer from the second device to the control center is initiated from the control center or by a device forwarding the data transfer between the second device and the control center.

12. The system according to claim 1, wherein both the RFID data transfer from the RFID device to the second device and the transfer of the collected data from the second device to the control center is initiated from outside said second device.

13. The system according to claim 3, wherein, the sensor is a temperature sensor, a humidity sensor, a pressure sensor, force sensor, a light sensor, an acoustic sensor, an acceleration sensor or a switch.

14. An RFID device for wireless transmission of data, wherein the data comprises at least identification information identifying a source of the data, wherein the RFID device comprises
a processor,
a transmitter circuit for transmitting data on RF channel, and
a receiver circuit for receiving on RF channel an acknowledge message,
a timer device operatively connected to control an operating voltage of the processor, the receiver circuit, and the transmitter circuit,
wherein the RFID device has an active mode and a power saving mode,
wherein in the power saving mode of the RFID device its capability to receive messages is lower than in a monitoring and/or receiving period of the active mode, the timer device of each RFID device switching off the operating voltage of the processor, the receiver circuit, and the transmitter circuit in the power saving mode, the timing device remaining active during the power saving mode,
the RFID device monitors RF signal strength on the RF channel during the active mode, and the transfer of said data by the RFID device is dependent on the value of the indicated signal strength.

15. The RFID device according to claim 14, wherein the RFID device comprises an input for receiving a signal from a sensor and the transmitter circuit includes information on said sensor signal in the data to be transmitted.

16. The RFID device according to claim 14, wherein the RFID device monitors the RF channel to provide the monitoring during two successive time periods.

17. The RFID device according to claim 14, wherein the RFID device monitors communications on the RF channel when the receiver circuit is in the active mode to determine whether the communications exceeds a predetermined level.

18. The RFID device according to claim 17, wherein the RFID device is adapted to transmit the data on the RF channel depending on whether the communications activity on the RF channel exceeds the predetermined level.

19. The RFID device according to claim 14, wherein the RFID device is adapted to receive an acknowledgement message after the transmission of data, and the RFID device is further adapted to switch into power saving mode after the acknowledgement signal has been received.

20. The RFID device according to claim 14, wherein,
the timer device comprises a clock and counter circuits,
when the timer device switches off the operating voltage of the processor, the receiver circuit, and the transmitter circuit in the power saving mode, and during the power saving mode the timer device monitors time and inputs of the RFID device, and
wherein the timer circuit measures the length of an elapsed time period of power saving mode and turns the RFID device into the active mode after a predetermined period of time has lapsed.

21. The RFID device according to claim 14, wherein a data transfer sequence of the active mode comprises a monitoring period, a data transmission period and a period for receiving an acknowledgement message.

22. The RFID device according to claim 14, wherein the processor has an off state with no processing activities and zero power consumption, wherein the timer devices turns the processor to be in the off state during the power saving mode.

23. The RFID device according to claim 14, wherein the sensor is a temperature sensor, a humidity sensor, a pressure sensor, force sensor, a light sensor, an acoustic sensor, an acceleration sensor or a switch.

24. The RFID device according to claim 14, further comprising a disposable or rechargeable battery for supplying power.

25. A method for transferring data from an RFID device to a second device of a data acquisition system, comprising:
for a RFID device comprising a processor, a receiver circuit, a transmitter circuit, and a timer device, selectively operating the RFID device in each of an active mode and a power saving mode wherein in the power saving mode the RFID device has no capability to receive information from an RF channel when compared to the capability in a monitoring and/or receiving period of the active mode,
activating the RFID device from the power saving mode into the active mode,
monitoring signal strength of the RF channel in the active mode,
comparing the indicated signal strength with a predetermined value,
transmitting data from the RFID device on the basis of the result of the comparison, and using the timer device of the RFID device to set the RFID device into the power saving mode, wherein the timer device of each RFID device switching off an operating voltage of the processor, the receiver circuit, and the transmitter circuit in the power saving mode, the timing device remaining active during the power saving mode.

26. The method according to claim 16, wherein a sensor signal is received from a sensor to the RFID device, and said transmitted data includes information relating to the received sensor signal.

27. The method according to claim 16, wherein after turning to active mode, the signal strength of the RF channel is indicated in at least two successive periods prior to transmitting the data.

28. The method according to claim 16, wherein the transmission of data on the RF channel is actuated if the signal strength indicated on the RF channel does not exceed a predetermined level.

29. The method according to claim 16, wherein after receiving the data in the second device, an acknowledgement message is transferred from the second device to the RFID device, and the RFID device is turned into the power saving mode after the acknowledgement message has been received.

30. The method according to claim 16, wherein the length of the time period of power saving mode is measured and compared to a predetermined value of time, and the data transfer sequence is started after the predetermined period of time has lapsed.

31. The method according to claim 16, wherein a data transfer sequence of the active mode comprises a signal strength monitoring period, a data transmission period and a period for receiving an acknowledgement message.

32. The method according to claim 16, wherein in the power saving mode the processor of the RFID device is turned into an off state wherein the processor provides no processing activities and consumes zero power.

33. The method according to claim 16, wherein the signal received from a sensor corresponds to measured temperature, humidity, pressure, force, light, sound intensity, acceleration or an on/off information.

34. The method according to claim 16, wherein the acknowledge message includes control information, and the RFID device is controlled in accordance with the transferred control information.

35. The method according to claim 16, wherein the data transfer from the second device to a control center is initiated from the control center or by a device forwarding the data transfer between the second device and the control center.

36. The method according to claim 16, wherein both the RFID data transfer from the RFID device to the second device and the transfer of the collected data from the second device to the control center is initiated from outside said second device.

37. The system according to claim 1, wherein, when the timer device switches off the operating voltage of the processor, the receiver circuit, and the transmitter circuit in the power saving mode, power consumption of the processor, the receiver circuit, and the transmitter circuit is zero.

38. The system according to claim 37, wherein,
the timer device comprises a clock and counter circuits,
when the timer device switches off the operating voltage of the processor, the receiver circuit, and the transmitter circuit in the power saving mode, and during the power saving mode the timer device monitors time, and
wherein the timer circuit measures the length of an elapsed time period of power saving mode and turns the RFID device into the active mode after a predetermined period of time has lapsed.

\* \* \* \* \*